United States Patent [19]

Lagoni et al.

[11] Patent Number: 5,339,114
[45] Date of Patent: Aug. 16, 1994

[54] TELEVISION RECEIVER WITH LUMINANCE SIGNAL CLAMPED OFFSET AND RE-CLAMPED PRIOR TO CONTRAST CONTROL FOR PREVENTING BLACK LEVEL CHANGES WITH CONTRAST CONTROL CHANGES WHEN DISPLAYING LUMINANCE SIGNALS HAVING ELEVATED BLACK LEVEL

[75] Inventors: William A. Lagoni; Ronald T. Keen, both of Indianapolis; Charles B. Neal, Zionsville, all of Ind.

[73] Assignee: Thomson Consumer Electronics, Inc., Indianapolis, Ind.

[21] Appl. No.: 922,107

[22] Filed: Jul. 29, 1992

[51] Int. Cl.$^5$ .................................. H04N 5/16
[52] U.S. Cl. .................................. 348/673; 348/695
[58] Field of Search ............... 358/183, 150, 176, 172, 358/174, 140, 34, 21 R, 171, 160, 168, 169; 359/173, 194, 189; 348/678, 673, 679, 691, 692, 695; H04N 5/16, 5/57, 9/800, 5/18, 5/20, 9/72

[56] References Cited

U.S. PATENT DOCUMENTS

| | | | |
|---|---|---|---|
| 3,898,644 | 8/1975 | Baxter | 358/183 X |
| 4,124,869 | 11/1978 | Heitmann | 358/172 X |
| 4,400,719 | 8/1983 | Powers | 358/140 X |
| 4,454,544 | 6/1984 | Abbott | 358/150 X |
| 4,517,586 | 5/1985 | Balaban et al. | 358/13 |
| 4,686,568 | 8/1987 | Weitzel | 358/150 |
| 5,018,012 | 5/1991 | Tsuji | 358/34 X |
| 5,084,700 | 1/1992 | Christopher | 341/118 |
| 5,132,828 | 7/1992 | Conner et al. | 358/176 X |
| 5,146,332 | 9/1992 | Hara et al. | 358/172 |

FOREIGN PATENT DOCUMENTS

| | | | |
|---|---|---|---|
| 0055321 | 5/1977 | Japan | 358/172 |
| 0188979 | 11/1983 | Japan | 358/141 |
| 0061378 | 4/1984 | Japan | . |
| 0184056 | 8/1986 | Japan | . |
| 0192170 | 8/1986 | Japan | . |
| 0187990 | 8/1988 | Japan | H04N 9/800 |
| 0058178 | 3/1989 | Japan | . |

OTHER PUBLICATIONS

"Ire Standards on Television: Definition of Color Terms", 1955, Appendix B Full Text of FCC Tehcnical Standards Amended to Incorporate Color.

*Primary Examiner*—David E. Harvey
*Attorney, Agent, or Firm*—Joseph S. Tripoli; Peter M. Emanuel; Richard G. Coalter

[57] ABSTRACT

A video input signal to be displayed is applied to an offset clamp circuit which effects a DC offset of blanking and active video portions of each video line. The DC offset or shift is of an amount and in a polarity sense to place the black level of the active portion of an NTSC color standard signal at a level corresponding to blanking level of the NTSC color standard. Advantageously, subsequent clamping at the shifted level enables contrast control without altering the black level of displayed images.

4 Claims, 7 Drawing Sheets

TELEVISION RECEIVER WITH LUMINANCE SIGNAL CLAMPED OFFSET AND RE-CLAMPED PRIOR TO CONTRAST CONTROL FOR PREVENTING BLACK LEVEL CHANGES WITH CONTRAST CONTROL CHANGES WHEN DISPLAYING LUMINANCE SIGNALS HAVING ELEVATED BLACK LEVEL

FIELD OF THE INVENTION

This invention relates to television systems generally and particularly to luminance signal clamping circuits for use in television systems.

BACKGROUND OF THE INVENTION

In conventional television systems, such as "PAL", "NTSC" and "SECAM", the brightness of a displayed image is conveyed by the direct current (D.C.) level of the base-band video signal luminance component. To provide a uniform frame of reference for expressing "brightness" and other video components (such as the horizontal synchronizing component) it is customary to refer to base-band luminance signal components in terms of a "normalized" signal range rather than specific voltage levels. One common normalized range is expressed in terms of so-called "IRE" units after a standardization organization (the Institute of Radio Engineers) that proposed it. Briefly, the standard IRE signal range extends from a low value of −40 IRE, which represents the horizontal synchronizing signal "tip" level, to high value of +100 IRE which represents the luminance signal peak white level. Within the range between −40 IRE and +100 IRE there is a level associated with video signal "black level".

In the United States, prior to the adoption of color transmission standards, the luminance signal "black level" was defined to be "0" IRE thus providing a black-to-white range of exactly 100 IRE for monochrome video signals. This standard changed, in the United States, upon the adoption of compatible color television transmission standards. Specifically, in the U.S. color television transmission standard, the peak white level and the sync tip levels were maintained at levels of +100 IRE and −40 IRE, respectively. However, the "black level"0 was changed from 0 IRE to +7.5 IRE. This new IRE level is generally referred to as the black level or the "black set-up" level. The zero IRE unit level continued to be used as the blanking reference level of the horizontal blanking interval and is some times referred to as the "blacker than black" level.

Under this new standard, the signal range between −40 IRE (sync tip level) and zero IRE ("blacker than black" or blanking) signal level is used for horizontal synchronizing signal components and the range between +7.5 IRE (the new "black level" or the so-called "set-up" level) and 100 IRE (peak white) represents signals used for conveying active video information representative of displayed images. See, for example, the article IRE STANDARDS ON TELEVISION: DEFINITIONS OF COLOR TERMS, 1955, Appendix B entitled "Full text of FCC Technical Standards Amended to Incorporate Color", which is believed to have been published by the IRE (Institute of Radio Engineers) circa 1955.

To summarize the foregoing, under the NTSC color transmission standard, the range between zero IRE level and +7.5 IRE level represents, in effect, a "guard zone" between the synchronizing components and the active video components of a video signal. Advantageously, in countries adopting the new transmission standards, it is easier to distinguish between the synchronizing luminance signals (e.g., −40 IRE to zero IRE for horizontal sync) and the active video signals (e.g., +7.5 IRE to +100 IRE) because they occupy different signal ranges.

SUMMARY OF THE INVENTION

It is herein recognized that, under certain specific conditions, the adoption of a black level value which differs from the blanking level value, as described above, can create a problem with regard to undesirable interaction of the receiver contrast control and black level settings. More specifically, in conventional television receivers it is customary practice to provide "clamping" or "DC restoration" operations based on the level of the "back porch" level of the video blanking signal which corresponds to a signal level of "0" IRE units. There may be several such clamping operations performed at different signal processing stages in a television receiver. The "0" IRE level is commonly chosen for clamping because this level is easily identified since there is a transmitted reference level (e.g., the back porch of blanking) which corresponds to this level. By contrast, there is no transmitted specific reference level to identify the 7.5 IRE signal level.

In a conventional contrast control, the video signal is first DC restored (clamped) to a reference level corresponding to 0 IRE and is then applied to a variable gain device such as a potentiometer, variable attenuator or gain controlled amplifier which varies the contrast by amplifying or attenuating the clamped video signal. As the customer varies the contrast (also called "pix" or "picture" control), the actual location of the 7.5 IRE black level changes. In other words, with clamping or DC restoration provided at a level of 0 IRE units, the 0 IRE unit level is held constant while all higher video levels are either amplified (increased contrast) or attenuated (decreased contrast) as the user changes the contrast control setting.

The foregoing undesirable effect is illustrated in FIG. 2 which shows the transfer function of a contrast control in which the input video signal is subjected to clamping at the back porch level (0 IRE) of horizontal blanking. The transfer function 202 illustrates the case "A" for a medium setting of the contrast control with a gain of "0" dB or "unity". The slope (m) of the transfer function equals 1:1 and so the output video signal is an exact replica of the input video signal. Thus, for this setting "A" of the contrast control, a black level input signal of 7.5 IRE units will produce a black level output signal of the exact same value, 7.5 IRE. If, however, the contrast is increased as shown by transfer function 204, the slope m will be greater than unity and so the video output signal will be greater than the video input signal. As a result, a 7.5 IRE black level input signal will be amplified (e.g., point "C" and will result in an output signal greater than 7.5 IRE. Conversely, a decrease in contrast setting results in a transfer function 206 of smaller slope (m<1) and so the video output signal (Point "C") will be lower than 7.5 IRE for a 7.5 IRE black level input signal.

To summarize the foregoing, for the case where black level is transmitted at 7.5 IRE and clamping is done at a different level (0 IRE) there will be a change in black level (e.g., A, B, C) as the contrast control is changed.

As previously explained, clamping is normally done at the zero IRE level because there is a transmitted reference signal (blanking level) of the zero IRE value whereas there is no transmitted reference signal for the 7.5 IRE level. Since the 7.5 IRE level is not transmitted in the form of a specific identifiable reference level but zero IRE is transmitted and easily identified, it is common to provide clamping at the Zero IRE level.

The problem of black level changes with contrast control setting has here-to-fore been approached by using specific factory set-up levels for the receiver. Specifically, it is conventional practice for the manufacturer to select a specific contrast setting (usually maximum) and adjust the picture tube cut-off bias voltage so that a 7.5 IRE signal barely lights the kinescope screen. If the user then adjusts the contrast control to any lower value, this 7.5 IRE signal level will not light the screen. The effect is that pictures tend, at the lower contrast settings, to be blacker than the picture actually transmitted since lower settings of the contrast control force all signal levels towards black.

The present invention resides in part in the recognition that a need exists for improvement in video signal processing for reducing the effect of contrast control changes on the black reference level of displayed images.

Television receiver apparatus, embodying the invention, comprises a source for providing a video input signal having an active video interval and a horizontal synchronizing interval. A DC offsetting means, coupled to said source, applies a given DC offset to the video input signal during a predetermined portion of said horizontal synchronizing interval of said video input signal or during the active video portion of the signal for producing a modified video output signal. A display means is coupled to said DC offsetting means for displaying said modified video output signal.

In accordance with a specific embodiment of the invention the DC offsetting means includes an input clamp for clamping said video input signal to a blanking reference level, a DC voltage source providing a DC voltage offset from said blanking reference level by said given amount, and a switch controlled to replace said video signal during said portion of said horizontal synchronizing interval with said DC voltage provided by said DC voltage source. Other embodiments are given wherein the DC offset is applied to the active video interval, rather to the horizontal blanking interval.

BRIEF DESCRIPTION OF THE DRAWING

The foregoing and further features of the invention are shown in the accompanying drawing wherein like elements are denoted by like reference designators and in which.

DETAILED DESCRIPTION

Figure 1:
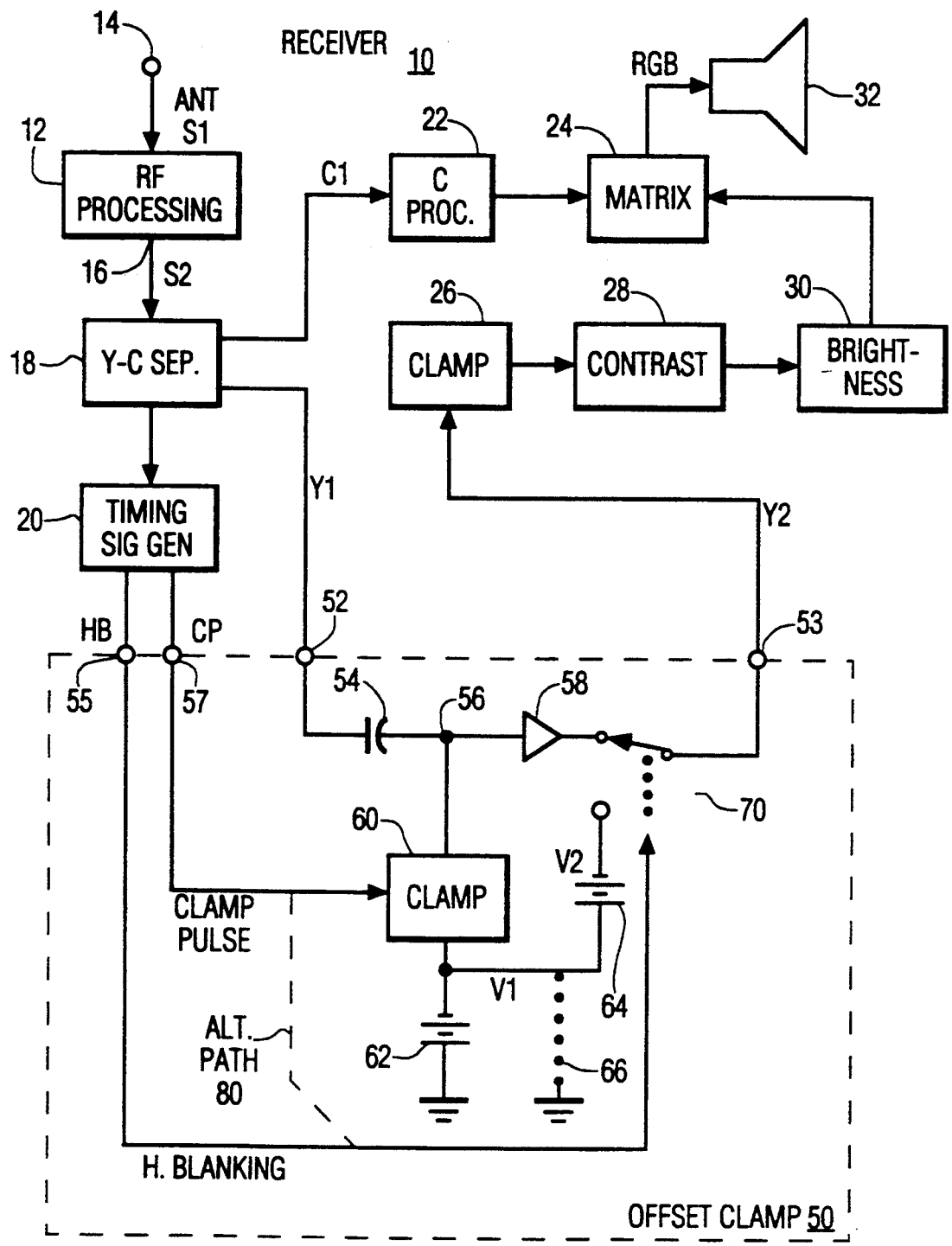
FIG. 1 is a block diagram of a television receiver including offset clamping apparatus embodying the invention.
Figure 2:
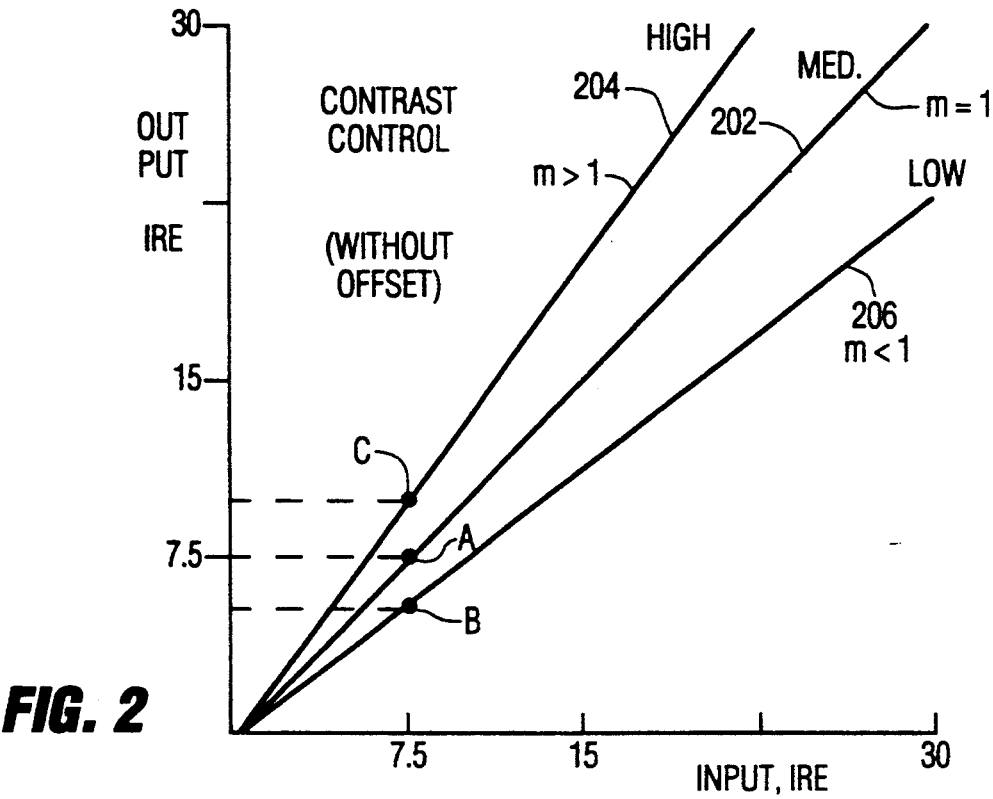
FIG. 2 is a transfer function diagram illustrating the effect of black level dependence on contrast control setting for a conventional television receiver which lacks offset clamping apparatus of the present invention.
Figure 3:
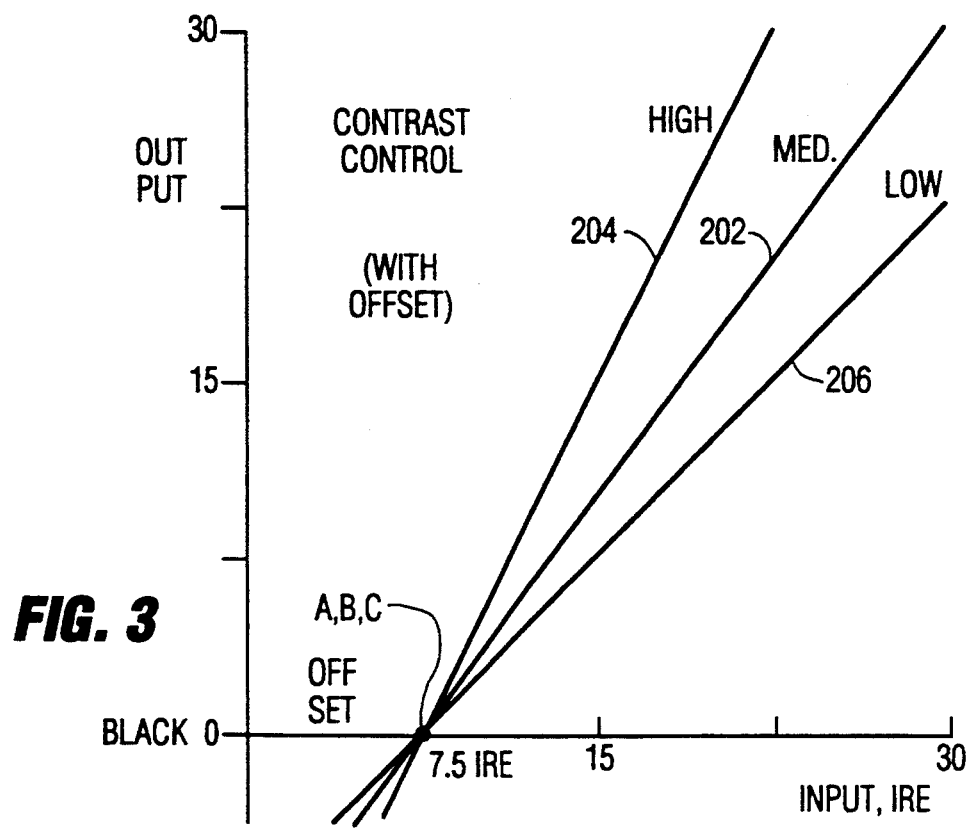
FIG. 3 is a transfer function diagram illustrating contrast control operation in the receiver of FIG. 1.

The receiver 10 of FIG. 1 includes an "offset clamp" circuit 50 (outlined in phantom), embodying the invention, which shifts or offsets the luma signal during a portion of the horizontal blanking interval. This offset or shift changes the reference level from "blanking level" (which is transmitted) to "black level" (which is not transmitted for NTSC color signals). Without the shift or offset, changes in the contrast setting would alter the black level of displayed images as previously discussed in connection with FIG. 2. With this offset or shift, contrast control settings do not affect the luminance signal black level as illustrated in FIG. 3 and discussed later.

Figure 4:
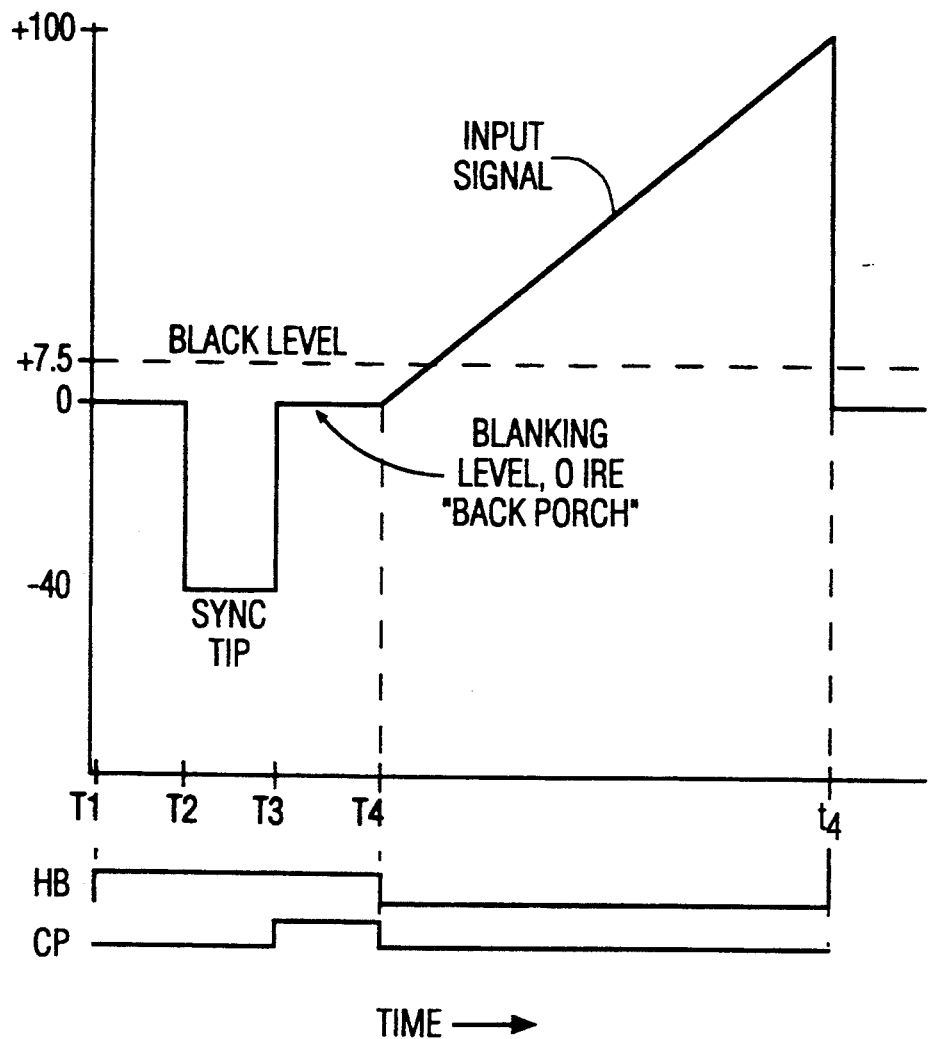
FIG. 4 is a waveform diagram illustrating an NTSC color standard video signal applied to the input of offset clamping apparatus of the receiver of FIG. 1.

In detail, the receiver 10 comprises an RF processing unit 12 having an antenna input 14 for receiving a television signal S1 and an output 16 providing a demodulated (baseband) video signal S2. A luminance/chrominance signal separator 18 separates the baseband signal S2 into a luminance component Y1 and a chrominance component C1 and also supplies a synchronizing signal to a timing signal generator 20 that generates various timing signals for use in the receiver. FIG. 4 illustrates the luminance signal timing. The timing signals include a horizontal blanking signal (HB) (e.g., T1 to T4 of FIG. 4) and a clamp pulse (CP) signal (e.g., T3 to T4 in FIG. 4).

After separation, the chrominance signal C1 is applied via a chrominance signal processor 22 to a matrix circuit 24. The luminance signal Y1 is applied to an offset clamp circuit 50, embodying the invention, which produces a modified luminance output signal Y2 in which at least the "back porch" interval (T3 to T4) of the horizontal synchronizing period is referenced to a new level representative of video black level. The modified luminance signal Y2 is then coupled via a clamp circuit 26, a contrast control circuit 28 and a brightness control circuit 30 to the other input of matrix 24 which combines C1 and Y2 to provide component color signals RGB to a kinescope 32 for display.

The offset clamp circuit 50 comprises an input terminal 52 which serves as a source for the luminance input signal Y1. As shown in FIG. 4, the luminance input signal Y1 includes an active video interval (times T4 to T5) and a horizontal synchronizing or blanking interval (times T1 to T4). During the synchronizing interval, times T1-T2 represent the so-called "front porch" of the synchronizing signal where the signal is at blanking level of 0 IRE units, times T2-T3 represent the horizontal synchronizing pulse during which the signal is at sync-tip level of −40 IRE units and times T3-T4 the so-called back-porch interval, the signal is again at blanking level of 0 IRE units.

Within offset clamp circuit 50 the luminance input signal Y1 is applied via a clamping capacitor 52 to a circuit node 56. The node 56 is coupled to the input of a non-inverting buffer amplifier 58 having a relatively high input impedance and is coupled also via a keyed clamp 60 to a source of reference potential V1 illustrated here as a battery 62. The clamp 60 is keyed by the clamp pulses provided by generator 20 during the back porch of the horizontal synchronizing interval. Accordingly, the signal at the output of amplifier 58 is clamped to blanking level.

Another source of reference potential is provided by another battery 64 coupled to battery 62 to provide a net reference potential of V2 volts. For the battery or reference voltage connections shown, voltage V2 will equal voltage V1 plus an offset (battery 64) selected to be the equivalent of 7.5 IRE units greater (in the white direction) than the voltage V1 (which corresponds to 0 IRE units). For the illustrated condition, the voltage V2 will "track" the blanking level voltage V1 since the reference voltages are in series. Accordingly, a change in voltage V1 will automatically be compensated for by a like change in the voltage V2 to thus ensure that the output voltage V2 always represents an offset of 7.5 IRE units relative the blanking level clamp voltage V1. Alternatively, separate sources may be used for the voltages V1 (blanking level reference) and V2 (7.5 IRE offset output voltage reference).

A switch 70 is coupled to the output of buffer amplifier 58 and to reference voltage source 64 for receiving the offset voltage V1. In this embodiment of the invention, the switch 70 is controlled by the horizontal blanking signal for selecting the output of amplifier 58 during the active video portions of a line (e..g., T4 to T5 in FIG. 5) and for selecting the 7.5 IRE unit reference voltage V2 during the entire horizontal synchronizing interval otherwise.

Figure 5:
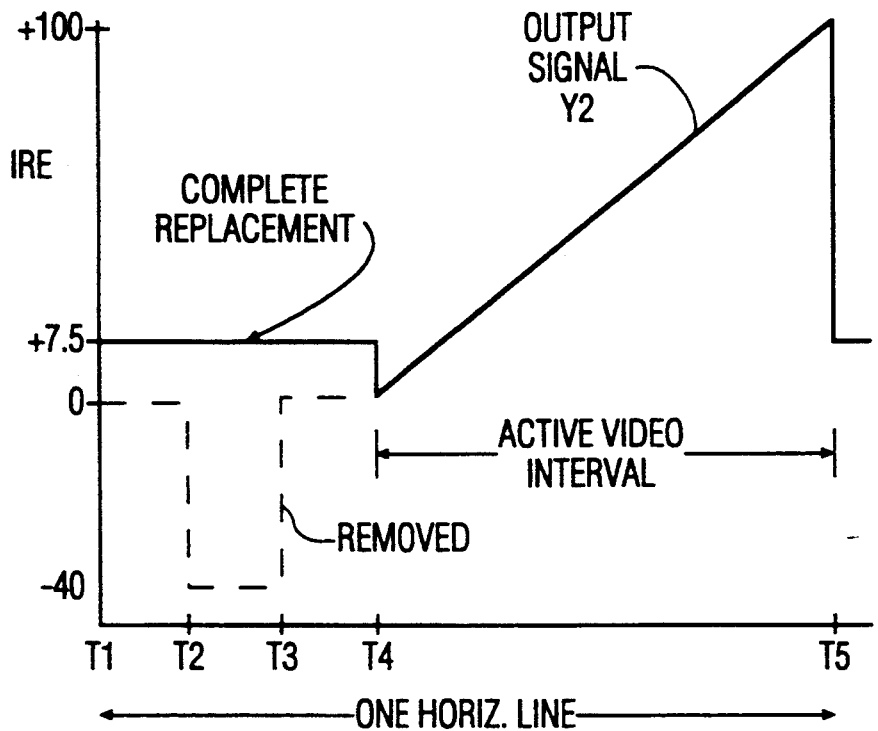
FIG. 5 is a waveform diagram illustrating the output of the offset clamping apparatus in the receiver of FIG. 1 responsive to the input waveform of FIG. 4.

FIG. 5 illustrates the output voltage Y2 for the embodiment described above. In this example, it is seen that there is a complete replacement of the entire horizontal blanking interval (front porch, sync pulse and back porch) by a constant DC voltage level that is offset by 7.5 IRE units relative to the blanking level of the video input signal Y1. Accordingly, when the modified signal Y2 is later clamped by the contrast control clamp 26, the contrast control will be referenced to black level rather than to blanking level. Accordingly, with this offset (7.5 IRE) the contrast control will operate as shown in FIG. 3 where it is seen that changes in the contrast control setting do not affect the black level of the modified video signal Y2.

Figure 6:
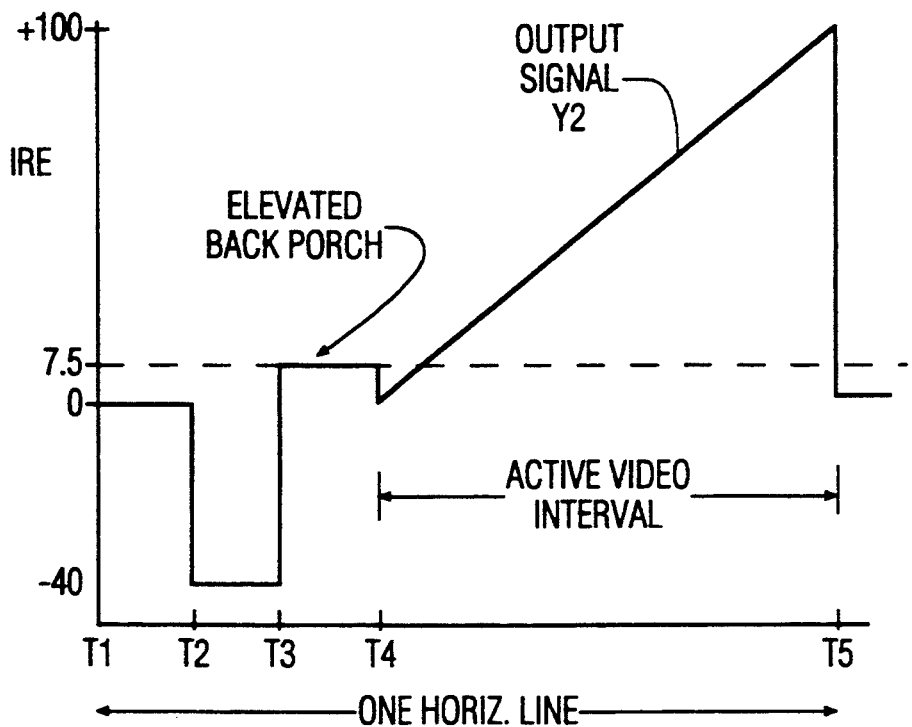
FIG. 6 is a waveform diagram illustrating a modification of the offset clamping apparatus of FIG. 1 for elevating (offsetting) a portion of the horizontal synchronizing interval signal in the receiver of FIG. 1.

Returning to FIG. 1, the alternate path 80 (dashed line) may be used for controlling the switch 70. In other words, in this modified embodiment, it is the clamp pulse that occurs in the back porch interval (T3 to T4) which controls the switch 70. The effect of this change is shown in FIG. 6 where it is seen that rather than completely replacing the blanking interval with the +7.5 IRE signal level, there is instead a partial replacement. Specifically, the +7.5 IRE reference is applied only during the back porch interval. The effect on the overall receiver operation is exactly the same as before because the contrast control clamp is keyed by the clamp pulse CP. In other words, it is not essential to replace all of the horizontal synchronizing interval to achieve the object of the invention. What is essential is that at least the back porch interval be offset from the blanking signal level that was originally transmitted. Accordingly, for this modified example of the invention, there is no change in black level with contrast control changes as shown in FIG. 3.

Figure 7:
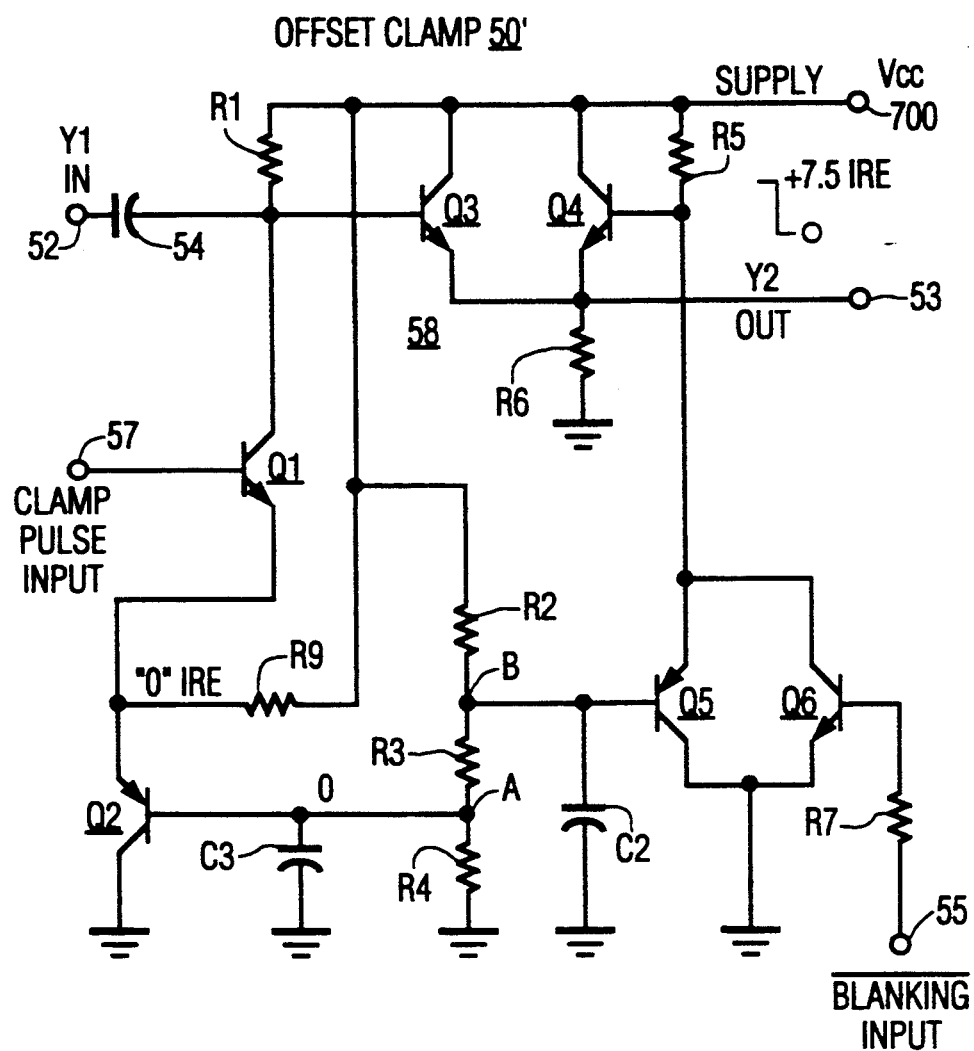
FIG. 7 is a schematic diagram of an analog circuit embodiment of the offset clamping apparatus of FIG. 1.

FIG. 7 is a detailed schematic diagram illustrating an analog circuit embodiment of the example of FIG. 1. A digital embodiment of the example of FIG. 1 is described later.

In FIG. 7 the voltage sources V1 and V2 are provided by a potential divider comprised of resistors R2, R3 and R4 coupled between Vcc supply terminal 700 and ground. The blanking level voltage at node "A" between resistors R3 and R4 is buffered by PNP emitter follower Q2 and its associated emitter resistance R9. Similarly, emitter follower transistor Q5 and resistor R5 buffers the black level representative voltage V2. Capacitors C3 and C2 provide filtering of any noise which may accompany the supply voltage Vcc. The clamp circuit (60 of FIG. 1) is formed by transistor Q1 having its base coupled to receive the clamp pulse CP provided to input 57 and its collector emitter path coupled between the input of buffer amplifier 58 and the 0 IRE reference source (emitter Q2). DC bias for amplifier 58 and the clamp capacitor is provided by resistor R1.

To summarize, capacitor C1, resistor R1 and transistor Q1 form a blanking level clamp which DC restores the luminance input signal Y1 such that the zero IRE back-porch voltage is approximately equal to the reference voltage at the emitter of transistor Q2. The input signal having been DC restored during the blanking interval is buffered by emitter follower Q3, R6 during a scan line. During the active portion of a line transistor Q6 is switched on thereby turning transistor Q5 off and turning transistor Q4 off also. During blanking time transistor Q6 is turned off and the base of Q4 is taken to a voltage (V2) representing 7.5 IRE above the clamp reference voltage at the Q2 emitter. This reverse biases transistor Q3 turning off the input signal Y1 and inserting a 7.5 IRE reference voltage during blanking time as shown in FIG. 5. Alternatively, if the clamp pulse CP (inverted) is used instead of the blanking signal HS for controlling transistor Q6, the output signal Y2 will be as shown in FIG. 6 in which only the back porch is elevated by the 7.5 IRE offset.

FIG. 1 herein, previously described, may be implemented in either digital or analog form. A specific example of analog implementation has been shown and described with reference to FIG. 7. A digital implementation is shown and will now be described with reference to FIG. 8.

Figure 8:
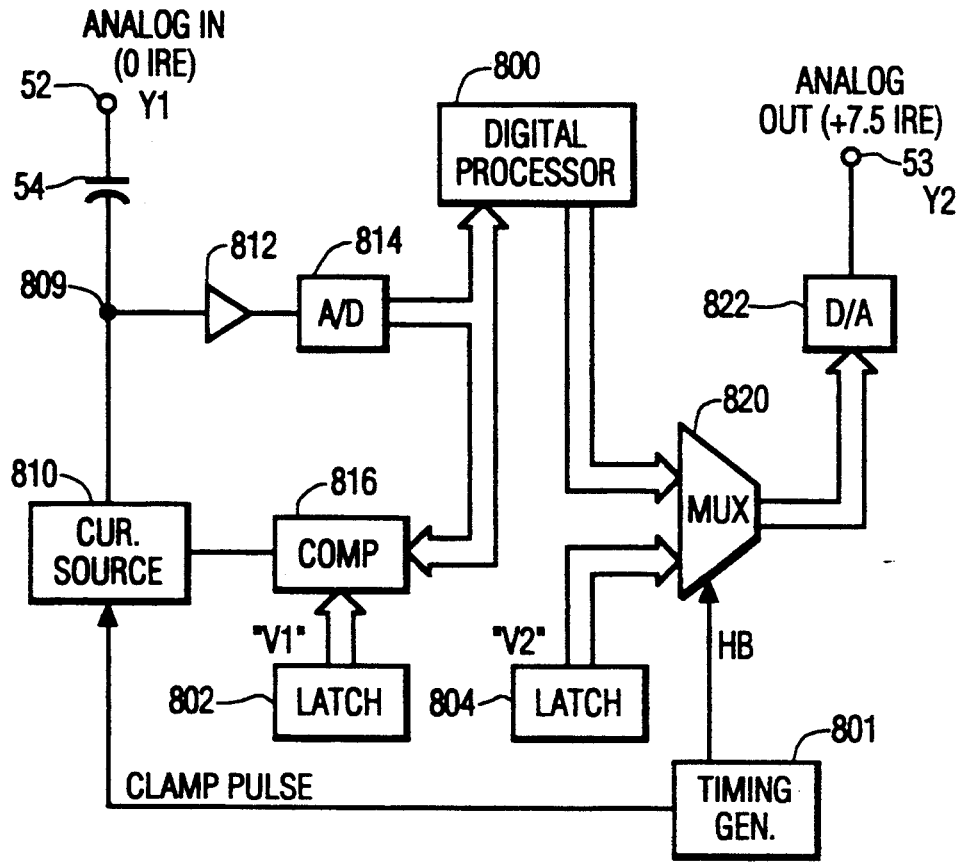
FIG. 8 is a block diagram of a digital embodiment of the offset clamping apparatus of FIG. 1.

The specific digital embodiment of FIG. 8 provides the functions of the previously described embodiments and the additional function of facilitating digital signal processing. This embodiment is particularly useful, for example, in an application where the video input signal Y1 is of analog form, digital signal processing is to be performed (e.g., for interlace conversion or the like) and the output is also to be of analog form.

In FIG. 8 the blanking level voltage "V1" comprises an eight bit binary number stored in a latch 802 and the +7.5 IRE black level reference voltage "V2" comprises an eight bit binary number stored in another latch 804. Blanking level clamping together with analog to digital (A/D) conversion is provided by coupling the clamp capacitor between the input terminal 52 and a current source 810 and buffer amplifier 812 the output of which is converted to a digital number by A/D converter 814. In operation, a comparator 816 compares the blanking level digital number provided by A/D converter 814 with the blanking level binary reference number (0 IRE) provided by storage latch 802. The result of the comparison is used to control the direction of current flow provided by a keyed bi-directional current source 810 when the clamp pulse signal is present. If the digital number is too high, source 810 with draws current from the node 809. Conversely, if the digital number is too low (during the back porch interval T3–T4) the current source supplies current to the node 809. Accordingly, the system regulates the digital output of converter 814 such that the back porch of the horizontal synchronizing interval is clamped to a digital value equal of blanking level, zero IRE.

The processed digital luminance signal is processed by digital processor 800 after being clamped to blanking level as described above. The processor 800 may comprise a progressive scan converter, a flicker reduction (field rate doubling) processor, a picture in picture processor or the like. If digital processing is not desired, processor 800 may be eliminated.

After digital processing, the zero IRE clamped digital signal is applied along with the +7.5 IRE representative digital signal to a multiplex switch 820 controlled by the horizontal blanking signal HB and the selected output signal is converted back to analog form by means of a digital to analog (D/A) converter 822. Since signal HB lasts from time T1 to T4, the video output signal is offset between times T1 and T4 as shown in FIG. 5. Alternatively, one may substitute signal CP for signal HB and the modified video output signal Y2 will be elevated by 7.5 IRE only during the back porch interval T3–T4 as shown in FIG. 6.

Figure 9:
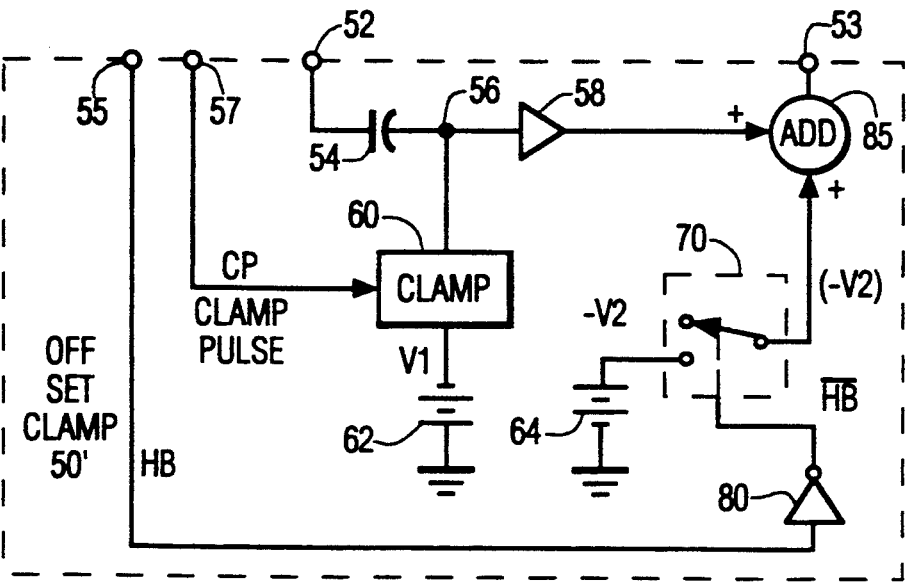
FIG. 9 is a block diagram illustrating a modification of an offset clamp circuit of FIGURE I embodying the invention.

In FIG. 9 the offset clamp circuit 50 of FIG. 1 has been modified so as to provide the 7.5 IRE black level compensation during the active video interval (T4 to T5) rather than during the horizontal blanking interval (T1 to T4). The modification comprises the addition of an adder circuit 85 which adds the output of buffer amplifier 85 to the output of switch 70. Battery 64 is connected between an input of switch 70 and ground. Also, switch 70 is controlled by an inverter 80 that inverts the horizontal blanking interval signal HB.

Figure 11:
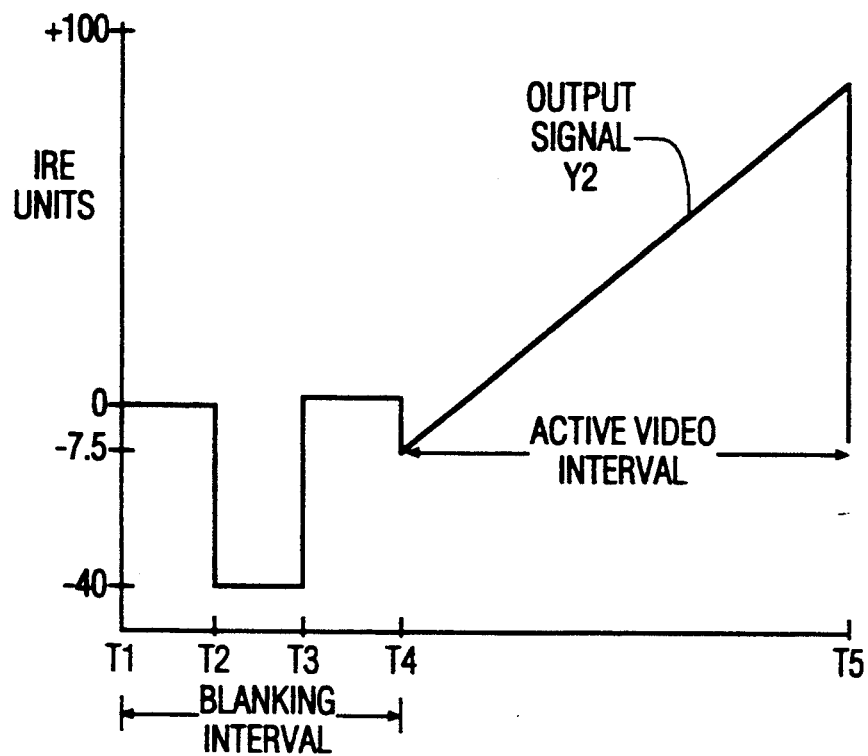
FIG. 11 is a diagram illustrating operation of the examples of FIGS. 9 and 10.

Operation of the modified circuit is similar to that previously described except that the horizontal blanking interval is not disturbed. Instead, during the active video interval the adder 85, under control of switch 70, adds the negative battery voltage 1V2 to the active video signal thus depressing the active video signal relative to the horizontal blanking signal by 7.5 IRE units. This is illustrated in FIG. 11 where it is seen that the active video is translated towards black level by 7.5 IRE units relative to the horizontal blanking signal and no change is made to the horizontal blanking signal.

Figure 10:
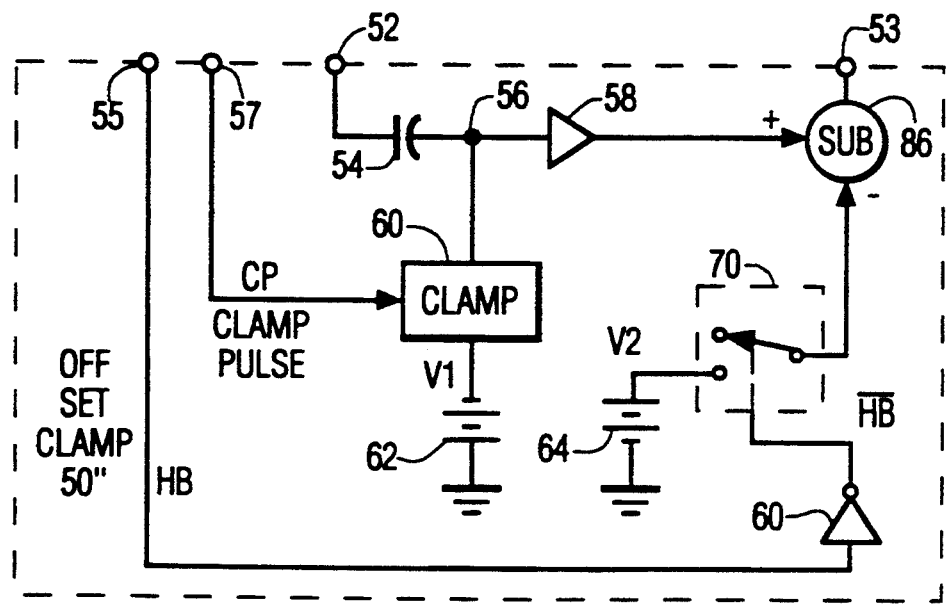
FIG. 10 is a block diagram illustrating a further modification of the offset clamp circuit of FIG. 9.

FIG. 10 illustrates a modification of the offset clamp circuit (50" in FIG. 10) similar to that of FIG. 9 except that rather than adding a negative offset to the active video signal, the adder is replaced with a subtractor 86 and the offset voltage (V2) is reversed. Accordingly, during the active video interval T4–T5 the 7.5 IRE offset voltage is subtracted from the active video signal. The result of subtracting a 7.5 IRE offset as in FIG. 10 is equivalent to the addition of a 7.5 IRE offset as in the example of FIG. 9 and so the overall effect is exactly the same as illustrated by the timing waveform diagram of FIG. 11 discussed above.

There has been shown analog and digital embodiments of television receiving apparatus embodying the invention. In the embodiments shown, a video input signal to be displayed is applied to an offset clamp circuit which shifts the relative levels of the active video and synchronizing portions of each line by a predetermined (e.g., 7.5 IRE) amount. Advantageously, subsequent clamping at the shifted level enables contrast control without altering the black level of the displayed images.

What is claimed is:

1. Television receiving apparatus, comprising:
    a source for providing a video input signal having two time intervals comprising an active video interval and a horizontal blanking interval,
    circuit means for coupling said video input signal to a first clamp circuit for providing a first clamped video output signal that is clamped at a level corresponding to a back porch level of the horizontal blanking portion of the video signal coupled thereto by said circuit means;
    a contrast control circuit coupled to said clamp circuit and responsive to said clamped video output signal for providing a clamped and contrasted adjusted video output signal;
    display means coupled to said contrast control circuit and responsive to said clamped and contrast adjusted video output signal for providing displayed images representative thereof;
    said video input signal having a pedestal level in said blanking interval and having a black level in said active video interval that differs from said pedestal level by a given amount;
    characterized in that:
        for counteracting a tendency for changes in the contrast control to alter the black level of said displayed images, said circuit means comprises:
        offsetting means having an input coupled to said source and having an output coupled to said input of said clamp circuit: for offsetting said video input signal applied to said clamp circuit by said given amount during one of said active video and horizontal blanking intervals of said video input signal,
        said offsetting means comprising:
        a second clamp circuit including a capacitor having a first plate connected to the output of said signal source for receiving said video input signal and means for coupling a second plate of said capacitor to a first reference level during a back porch portion of said blanking interval of said video input signal to provide a second clamped video signal;
        a source for providing a second reference level having a value which differs by said given amount from the value of said first reference level; and
        switching circuit means responsive to said second clamped video signal, to said second reference level and to a horizontal blanking timing signal supplied thereto for producing and applying a modified video output signal to said first clamp circuit; and wherein
        said modified video signal having an active video interval that is uniformly offset relative to the back porch level of said second clamped video signal by said given amount and in a given polarity for counteracting said tendency for said changes in said contrast control to change said black level of said displayed images.

2. Apparatus as recited in claim 1 wherein said one of said active video and horizontal blanking intervals comprises said horizontal blanking interval.

3. Apparatus as recited in claim 1 wherein said one of said active video and horizontal blanking intervals comprises said active video interval.

4. Television receiving apparatus as recited in claim 1 wherein said circuit means further comprises:

an analog to digital converter (814) having an input coupled to said second plate of said capacitor (54) and having an output coupled to a first input of a digital comparator (816) and to first input of a multiplex switch (820);

a first source (802) providing a binary number of a first value to said first input of said digital comparator and a second source (804) providing a second binary number of a second value to a second input of said multiplex switch;

a current source (810) responsive to an output signal of said comparator and a clamp pulse provided by a timing signal generator (801) for clamping said second plate of said capacitor to a DC voltage level corresponding to said binary number of said first value, said timing signal generator providing also a horizontal blanking timing signal to a control input of said multiplex switch; and means (822) for coupling an output of said multiplex switch to said first clamp circuit (26) as said modified video signal.

* * * * *